United States Patent [19]

Dixon et al.

[11] 4,036,366
[45] July 19, 1977

[54] STORAGE RACK AND HANGER ASSEMBLY

[75] Inventors: Cal L. Dixon; Charles E. Ross, both of Tulsa, Okla.

[73] Assignee: Kaiser Aluminum & Chemical Corporation, Oakland, Calif.

[21] Appl. No.: 667,741

[22] Filed: Mar. 17, 1976

[51] Int. Cl.² .............................................. E05B 73/00
[52] U.S. Cl. ..................................... 211/4; 211/60 T; 211/124
[58] Field of Search ..................... 211/4, 7, 8, 9, 60 T, 211/113, 117, 123, 124, 208; 17/44, 44.2; 70/58, 61, 62; 206/338; 43/57.5 R, 57.5 A

[56] References Cited

U.S. PATENT DOCUMENTS

| 862,505 | 8/1907 | Perrin | 211/8 |
|---|---|---|---|
| 1,266,001 | 5/1918 | Dickason | 211/117 X |
| 1,450,084 | 3/1923 | Hull | 211/8 |
| 1,957,352 | 5/1934 | Patrkoski | 43/57.5 A |
| 2,431,423 | 11/1947 | Robbins | 211/123 X |
| 2,525,259 | 10/1950 | Fenzl | 211/124 X |
| 2,889,050 | 6/1959 | Modrey | 211/4 |
| 2,940,683 | 6/1960 | Tauber et al. | 211/123 X |
| 2,943,581 | 7/1960 | Bendik | 17/44.2 X |
| 2,953,251 | 9/1960 | Stone et al. | 211/4 |
| 3,076,664 | 2/1963 | Baird | 211/113 X |
| 3,438,506 | 4/1969 | Groth | 211/4 |
| 3,850,300 | 11/1974 | Young | 211/4 |
| 3,853,225 | 12/1974 | Gegauff | 211/124 X |

Primary Examiner—Roy D. Frazier
Assistant Examiner—Thomas J. Holko
Attorney, Agent, or Firm—Paul E. Calrow; John S. Rhoades

[57] ABSTRACT

Improved storage rack and hanger assembly for meat hooks and the like wherein means are provided for immobilizing the meat hooks while at the same time storing the meat hooks in an out-of-the-way position so as to avoid damage thereto.

4 Claims, 5 Drawing Figures

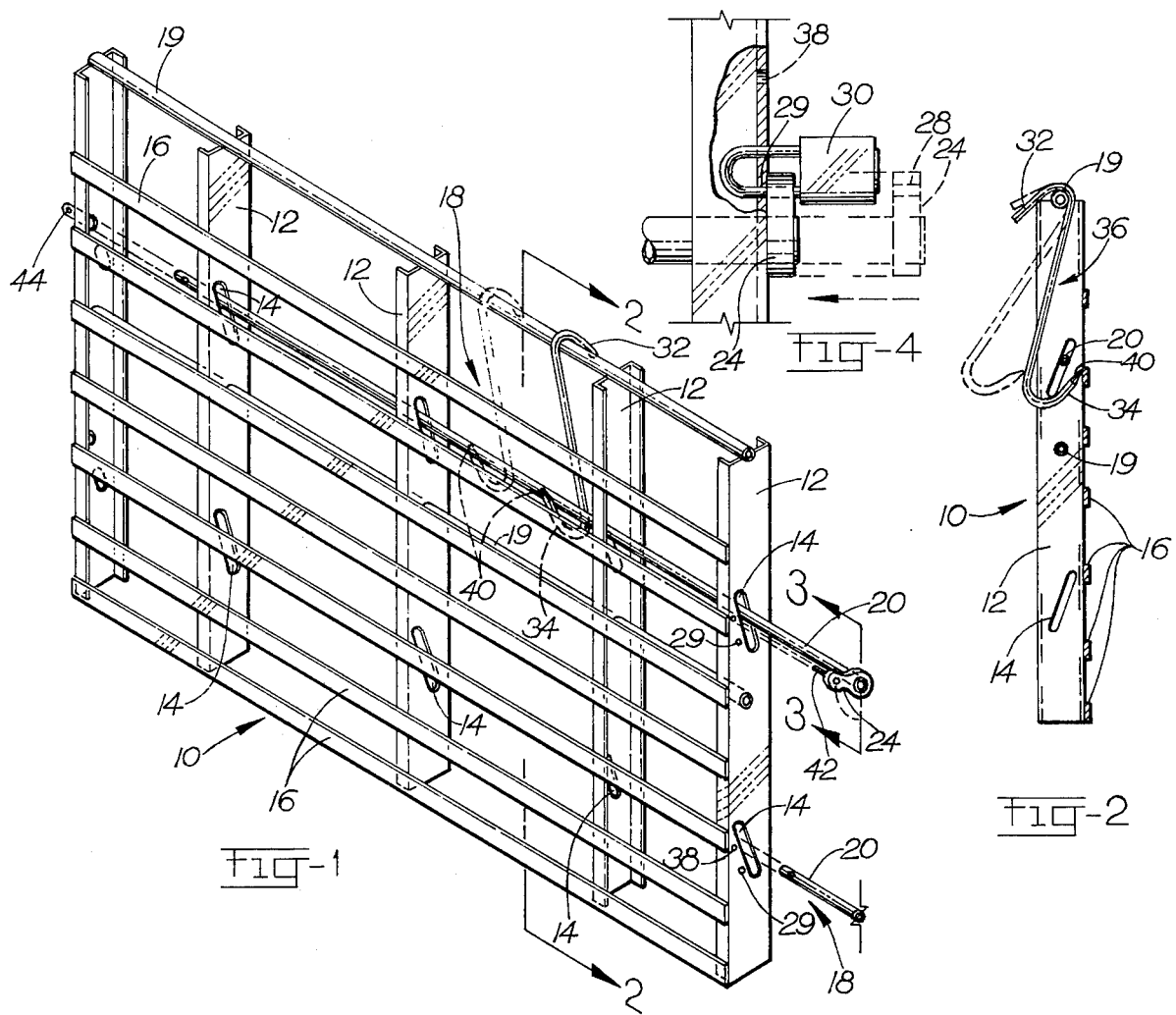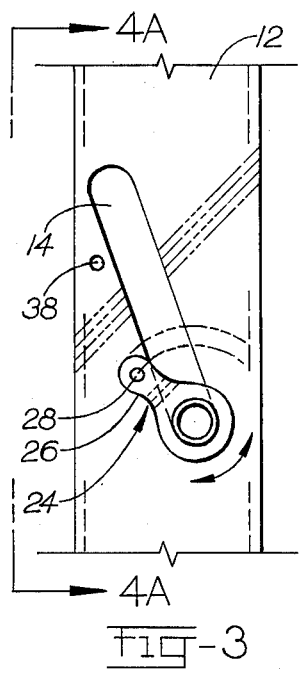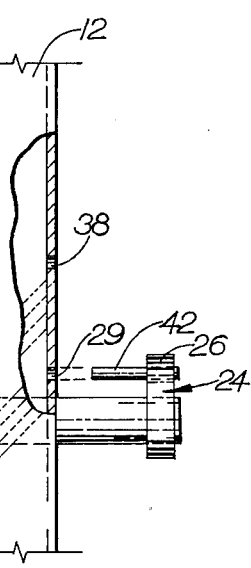

STORAGE RACK AND HANGER ASSEMBLY

BACKGROUND OF THE INVENTION

This invention relates to article storage racks and assemblies. More particularly, it is concerned with an improved storage rack and hanger assembly for supporting and immobilizing a plurality of meat hooks or the like that are provided with opposing hooked portions. The standard hooks that are used for hanging meats, such as dressed carcasses or parts thereof, are utilized in substantial quantities. Thus, although individually these hooks may not be expensive when considered in the aggregate because of the numbers used, they represent substantial sums.

Because of the size, shape and manner of utilization of these hooks in meat storage areas including vehicles, boxcars, boats and warehouses, they are readily subject to easy pilfering and theft. In addition, because of the sharp point at one or more ends of these hooks, it is necessary for the hooks to be so disposed during hanging and storage that the points are arranged in an out-of-the-way or special position so as not to constitute a hazard to passersby or be damaged by contact with a foreign object. Various schemes, techniques and arrangements have been proposed in the past for storing meat hooks and locking the same in position on a storage rack such as, for example, the systems and racks shown in U.S. Pat. Nos. 862,505; 2,590,533; 3,076,664 and 3,229,821.

These arrangements, however, have not been completely satisfactory because the hooks can be readily removed from the racks and stolen, or because the hooks are not completely immobilized during storage or because the hooks project out from the confines of the rack and constitute a hazard to passersby, etc.

The instant development is concerned with providing an inexpensive and efficient storage and rack assembly for meat hooks and the like that are provided with opposing hooked portions. The assembly involves the use of a plurality of bars which are engageable with the opposing ends of the meat hooks. When one of the bars is moved and locked in a predetermined position relative to the other bar, the bars act to immobilize the meat hooks engaged by the bars while at the same time retaining the pointed portions of the hooks in an out-of-the-way position, whereby they are less susceptible to becoming damaged as well as being less likely to damage or injure other objects or persons.

SUMMARY OF THE INVENTION

The instant invention is directed to an improved storage rack and hanger assembly for supporting and immobilizing a plurality of standard sized meat hooks and the like. This assembly is comprised of a frame or bulkhead provided with a plurality of generally parallel and spaced horizontally arranged bars or rods. One of these bars can be fixed while the other bar is adapted to be moved with respect to the first bar. They engage the opposing pointed ends or hooked portions of a standard meat hook. After one or more hooks have been loosely disposed about the two bars, the free bar is moved a selected distance from the fixed bar until the hooks are held somewhat tautly between the bars and immobilized. The movable bar is then locked in a fixed position by one or more finger-like elements secured to the movable bar. In one embodiment of the invention, the finger-like element is provided with an aperture which, upon rotation of the finger-like element to a selected position, is brought into registry with a corresponding aperture in a selected part of the bulkhead or frame. Thereafter, a locking pin means can be inserted through the registered and aligned apertures of the finger-like element and bulkhead so as to lock the movable bar and all of the meat hooks in contact with the two bars in fixed positions until it is desirable to remove one or more of the meat hooks.

Use of the bar means and the locking mechanism proposed also constitutes an improvement over the lockable display rack type assembly shown in U.S. Pat. No. 3,438,506. The instant assembly can comprise a portable bulkhead assembly or the entire assembly can be fixedly attached to the walls of a warehouse or transport vehicle. Even in the case of where the bulkhead is portable, however, and subject to tipping and falling during handling, the hooks will still be held in place and in a relatively taut or fixed condition. Thus, despite a certain amount of jostling and abuse during normal use including transit of the bulkhead, the danger of the hooks becoming dislodged and striking objects whereby the pointed portions of the hooks become dull and possibly unusable is minimized.

BRIEF DESCRIPTION OF THE DRAWINGS

FIG. 1 is a perspective view of a typical bulkhead or frame assembly to which the locking bars are attached for engaging the meat hooks;

FIG. 2 is a cross-sectional view generally taken along line 2—2 of FIG. 1;

FIG. 3 is an enlarged broken end view generally taken along line 3—3 of FIG. 1 with parts removed;

FIG. 4 is a fragmentary side elevational view with parts broken away of one end portion of the movable bar shown in FIG. 3 and discloses one locking scheme for holding the movable bar in a fixed position; and FIG. 4A is a view taken along line 4A—4A of FIG. 3 with parts added.

DETAILED DESCRIPTION

With further reference to the drawings and, in particular, FIG. 1, the storage rack and hanger assembly of the instant invention generally comprises a frame or bulkheiad 10 that can be made of a light metal, such as aluminum or magnesium. This bulkhead can be made a permanent or portable fixture of a refrigerated vehicle otherwise known in the table as a "reefer" or it can comprise warehouse racks, etc.

The channel-shaped metal posts 12 can be roll formed or extruded aluminum sections provided with inclined slots 14. Stringers 16 are affixed as by welding to one of the flanged sides of each post so as to provide in effect a protective covering on one side of the frame 10 while allowing the other side of the frame to be open so that access can be had to the several bar assemblies 18 mounted thereon.

These bar assemblies are arranged in cooperating pairs with one bar element 19 of a pair being permanently fixed in place and the other bar element 20 being movably disposed relative to the first bar element within a given series of elongated and inclined slots 14 located in the various posts. The slots 14 that are adapted to receive the movable bars or rods 20 are aligned as indicated particularly in FIG. 1. Rigidly affixed to each movable bar 20 is one or more finger elements 24 which in one embodiment of the invention and as indicated in FIG. 4 are provided with apertured section 26. When a bar 20 and its associated finger element 24 are rotated in such a way that the aperture 28 in the finger section 26 is registered or aligned with a similar opening 29 in the web of the adjacent post 12 and a padlock 30 inserted in openings 28 and 29 and locked in place, the movable bar 20 itself will be locked in position and immobilized. In one embodiment of the invention, only one finger element 24 need be used and it can be affixed to one extremity of a bar 20.

When, as indicated particularly in FIGS. 1 and 2 of the drawings, the opposing curved end portions 32 and 34 of a conventional stainless steel generally S-shaped meat hook or the like is mounted in place, one of the curved hook portions, e.g. the top portion 32, becomes wrapped around or engaged with one of the fixed bars 19 in a given assembly 18 while the other portion 34 is brought into loose engagement with the associated movable bar 20.

When the movable bar 20 of a given assembly 18 is next downwardly moved within its associated slots 14 to a position where the meat hooks in contact with the pair of bars 19 and 20 of such assembly 18 no longer move with any great deal of freedom and the finger element of bar 20 is rotated and the padlock 30 therefor put in place and locked as noted, the meat hooks themselves carries by the given assembly 18 will be completely immobilized. The width of the webs of the posts 12 should be sufficiently large as regards the size of the meat hooks to be stored whereby the meat hook points 40 are kept within the confines of the bulkhead or frame and out of the way of passersby so that personal injuries can be minimized and the point 40 not dulled upon contact with a foreign object.

Although the drawings indicate a given bulkhead can be of such a size that it is provided with two sets of cooperating bars 19 and 20, one of which is fixed and the other of which is movable, a bulkhead need have only one set of such bars or it can have three or more sets of bars.

A further embodiment of the invention contemplates that the sleeve-like finger element 24 be provided with a pin fitting 42 that can be inserted in the various openings 29 and 38 to hold the movable bar or rod 20 in the desired position. At the same time, the other extremity of the movable bar 20 can have an opening 44 for receiving the padlock 30 so as to lock the bar 20 in the lowered position after the fitting 42 has been first inserted in the lower opening 29. The aforesaid locking arrangements permit the bars 20 to be completely removed from the rack for cleaning and maintenance purposes. In addition, in those cases where one end of a bar 20 is provided with an opening 44, the post 12 located most closely adjacent the aforesaid apertured end of the bar can have two slightly spaced openings for receiving the bar, all as indicated in FIG. 1 instead of an elongated slot 14. One of these openings, e.g. the top opening receives the bar 20 in the unlocked condition and the other opening receives bar 20 in the lockable position.

Advantageous embodiments of the invention have been disclosed and described. It is obvious that various changes may be made therein without departing from the spirit and scope thereof as defined in the appended claims, wherein:

What is claimed is:

1. A meat hook rack and hanger assembly for supporting and immobilizing meat hooks and the like comprising the combination of a frame provided with posts and each of said posts having at least one inclined elongated slot aligned with a similar slot on an adjacent post, a first bar means fixedly mounted on the frame and a second bar means mounted within the slots of the posts of said frame and in movable spaced and generally parallel relation to said first bar means, each of said bar mans having such a configuration as to be engageable with only one of the separate and opposed curved end portions of a generally S-shaped meat hook and locking means engageable with selected parts of the frame and the second bar means for immobilizing the second bar means and the meat hooks engaged therewith after said second bar means has been moved a selected distance away from the first bar means and the selected parts of the second bar means and the frame brought into registry with each other.

2. The assembly of claim 1 wherein the locking means includes a finger-like element on the second bar means which is provided with an aperture which when brought into registry with a similar aperture on the frame is adapted to receive along with the last-mentioned aperture a locking element and said finger-like element also being rigidly affixed to said movable bar means.

3. The assembly of claim 1 wherein the locking means includes a pin-like fitting carried by one extremity of the movable bar means that is insertable in an aperture in the selected part of the frame upon a selected rotation of the movable bar means and the other extremity of the movable bar means being provided with an aperture for receiving a padlock means.

4. A storage rack and hanger assembly for supporting and immobilizing meat hooks and the like comprising the combination of a frame means, said frame means being provided with a plurality of spaced posts each of which is also provided with at least one elongated slot aligned with a siimilar slot on an adjacent post, a first bar means mounted on the frame means, a second bar means mounted on the frame means, said second bar means being mounted within the elongated slots in the posts of said frame means and in generally spaced parallel and movable relation to said first bar means whereby said second bar means can be moved toward and away from said first mentioned bar means to engage one end of a meat hook also engaged with the first bar means and for immobilizing the said meat hook, each of said bar means also having such a configuration as to be engageable with only one of the separate and opposed curved end portions of the meat hook, locking means including a pin-like fitting carried by the movable second bar means and extending in the same direction as the longitudinal axis of the second bar means for immobilizing the second bars means and the meat hooks engaged therewith after said second bar means has been moved a selected distance away from the first bar means and said pin-like fitting has been brought into registry and inserted in an aperture in a selected part of the frame means.

* * * * *